United States Patent [19]

Mehta et al.

[11] Patent Number: 5,699,542

[45] Date of Patent: Dec. 16, 1997

[54] ADDRESS SPACE MANIPULATION IN A PROCESSOR

[75] Inventors: Pranav Mehta, Chandler; Lionel Smith, Queen Creek; Robert Wickersheim, Mesa; Nicholas Ong, Tempe, all of Ariz.

[73] Assignee: Intel Corporation, Santa Clara, Calif.

[21] Appl. No.: 316,390

[22] Filed: Sep. 30, 1994

[51] Int. Cl.$^6$ .......................... G06F 12/00; G06F 12/02; G06F 12/06; G06F 12/10
[52] U.S. Cl. .......................... 395/412; 395/401; 395/402; 395/413; 395/416; 395/419
[58] Field of Search .................................. 395/401, 412, 395/419, 402, 416, 413

[56] References Cited

U.S. PATENT DOCUMENTS

| | | | |
|---|---|---|---|
| 5,187,792 | 2/1993 | Dayan et al. | 395/405 |
| 5,237,669 | 8/1993 | Spear et al. | 395/405 |

OTHER PUBLICATIONS

Pranav Mehta, "Introducing Intel's Family of Embedded Intel 386™ Microprocessors," (AP–499, Application Note), Feb., 1994.

Pranav Mehta, "Introducing Intel's Family of Embedded Intel386™ Microprocessors," (AP–499, Application Note), Sep. 1993.

Pranav Mehta, "Introducing Intel's Family of Embedded Intel386™ Microprocessors," (AP–499) Feb. 1994.

*Primary Examiner*—David K. Moore
*Assistant Examiner*—Than V. Nguyen
*Attorney, Agent, or Firm*—Blakely, Sokoloff, Taylor & Zafman

[57] ABSTRACT

A method and apparatus for configuring the address space of a computer is described. According to the present invention, a computer system has a full address space and includes at least one base unit, at least one expansion unit and a microprocessor core. The microprocessor core issues access addresses. The full address space includes a base address space and an expanded address space. The base address space is addressed by an M bit address and the expanded address space is addressed by an N bit address ($N \geq M$). Each base unit is mapped to an address within the base address space, and the base unit address is mirrored in the expanded address space. Each expansion unit is mapped to an address within the expanded address space. An address configuration circuit in the computer system includes an address space remapping circuit for selectively remapping or not remapping base units out of the base address space. The address configuration circuit also includes an expanded space enabling circuit for selectively enabling or disabling the expanded address space. Expansion units are accessible in the expanded address space depending upon whether the expanded address space has been enabled.

32 Claims, 6 Drawing Sheets

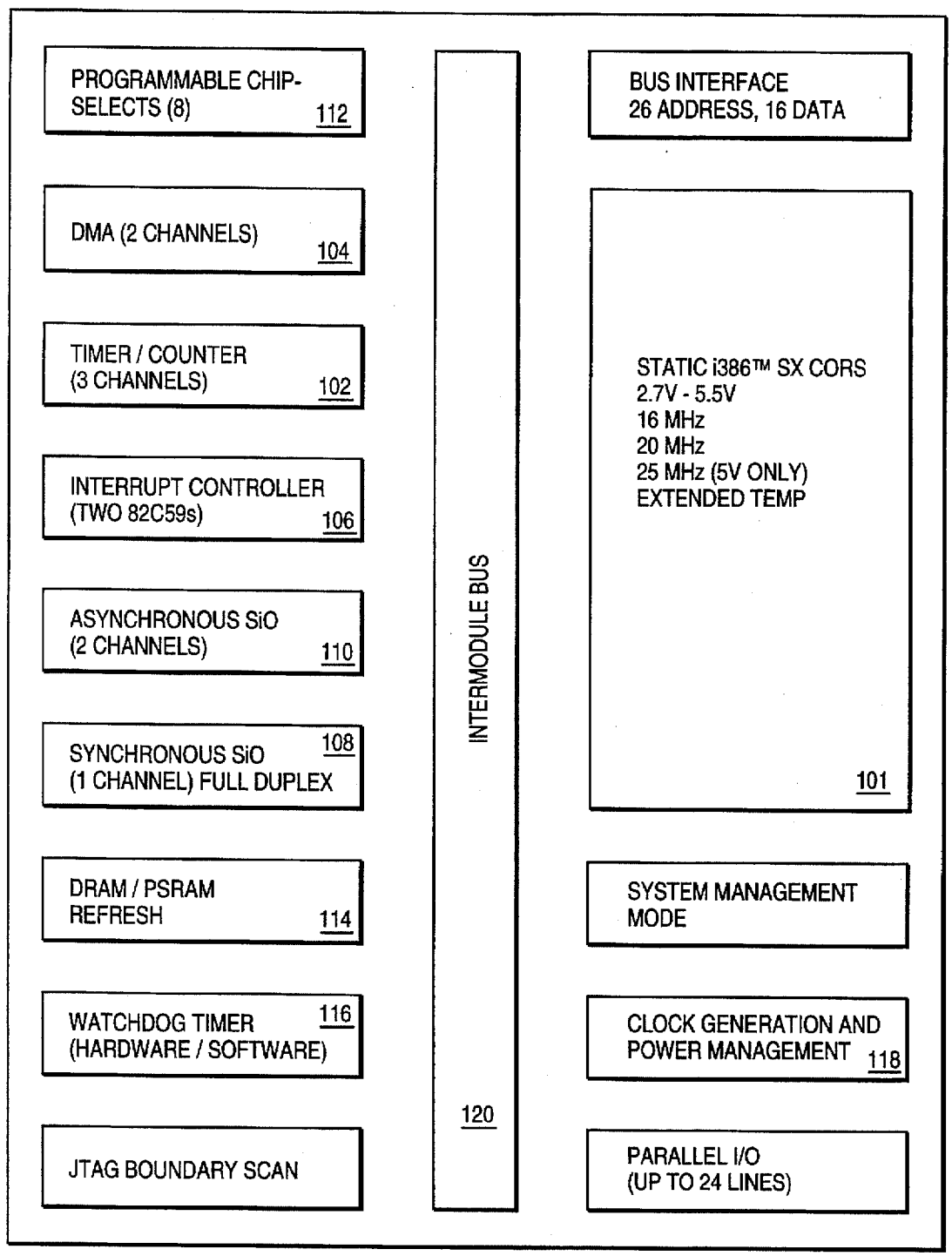
FIG_1A
(Prior Art)

| REGISTER DESCRIPTION | I/O ADDRESS RANGE |
|---|---|
| DMA CONTROLLER 1 | F000H - F01FH |
| MASTER INTERRUPT CONTROLLER | F020H - F03FH |
| PROGRAMMABLE INTERVAL TIMER | F040H - F05FH |
| DMA PAGE REGISTERS | F080H - F09FH |
| SLAVE INTERRUPT CONTROLLER | F0A0H - F0BFH |
| MATH COPROCESSOR | F0F0H - F0FFH |
| CHIP SELECT UNIT | F400H - F47FH |
| SYNCHRONOUS SERIAL I/O UNIT | F480H - F49FH |
| DRAM REFRESH CONTROL UNIT | F4A0H - F4BFH |
| WATCHDOG TIMER UNIT | F4C0H - F4CFH |
| ASYNCHRONOUS SERIAL I/O CHANNEL 0 (COM1) | F4F8H - F4FFH |
| CLOCK GENERATION AND POWER MANAGEMENT UNIT | F800H - F80FH |
| EXTERNAL/INTERNAL BUS INTERFACE UNIT | F810H - F81FH |
| CHIP CONFIGURATION REGISTERS | F820H - F83FH |
| PARALLEL I/O PORTS | F860H - F87FH |
| ASYNCHRONOUS SERIAL I/O CHANNEL 1 (COM2) | F8F8H - F8FFH |

FIG_1B

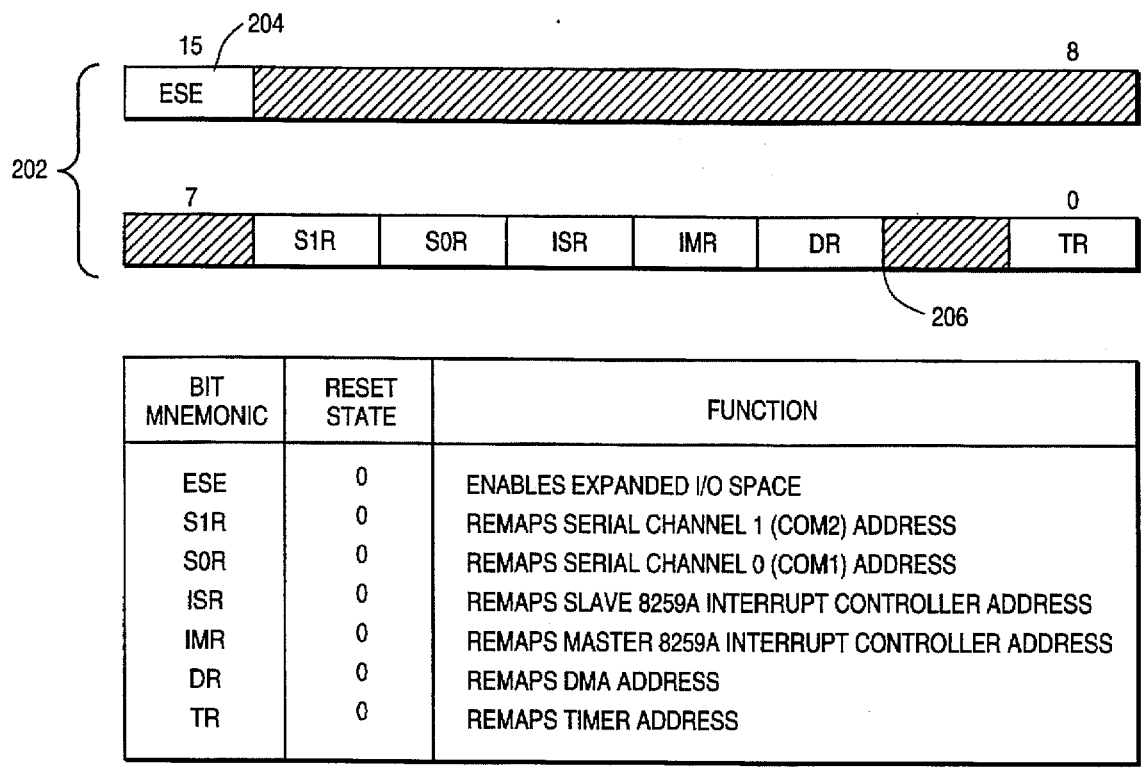
FIG_2B
FIG_3

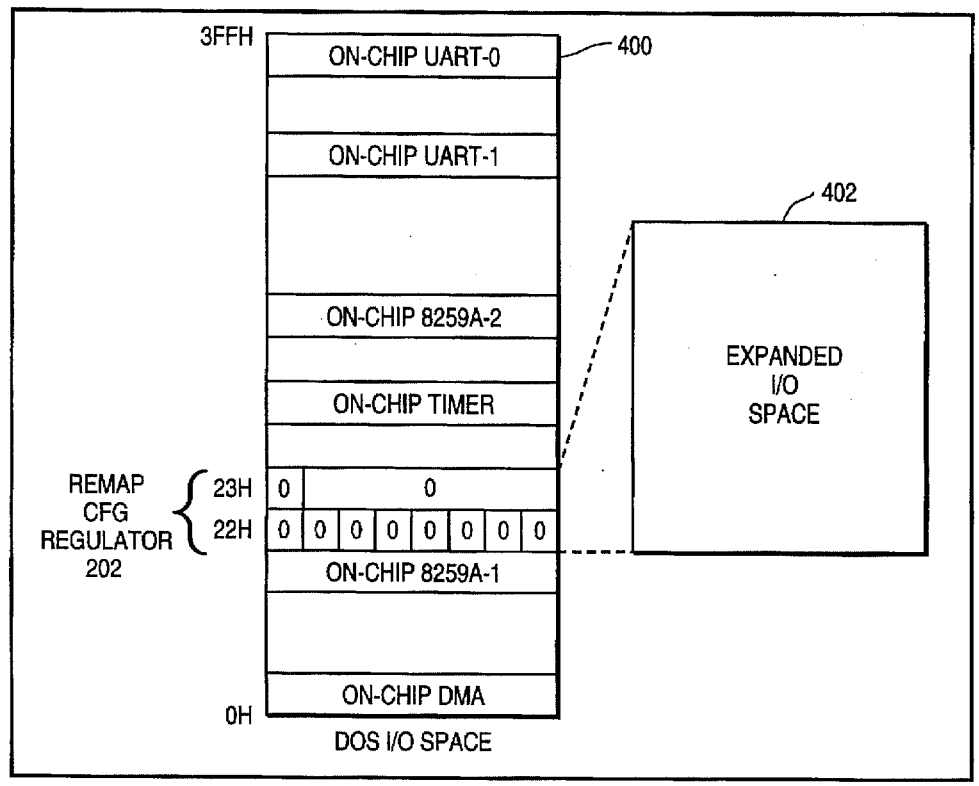
FIG_4
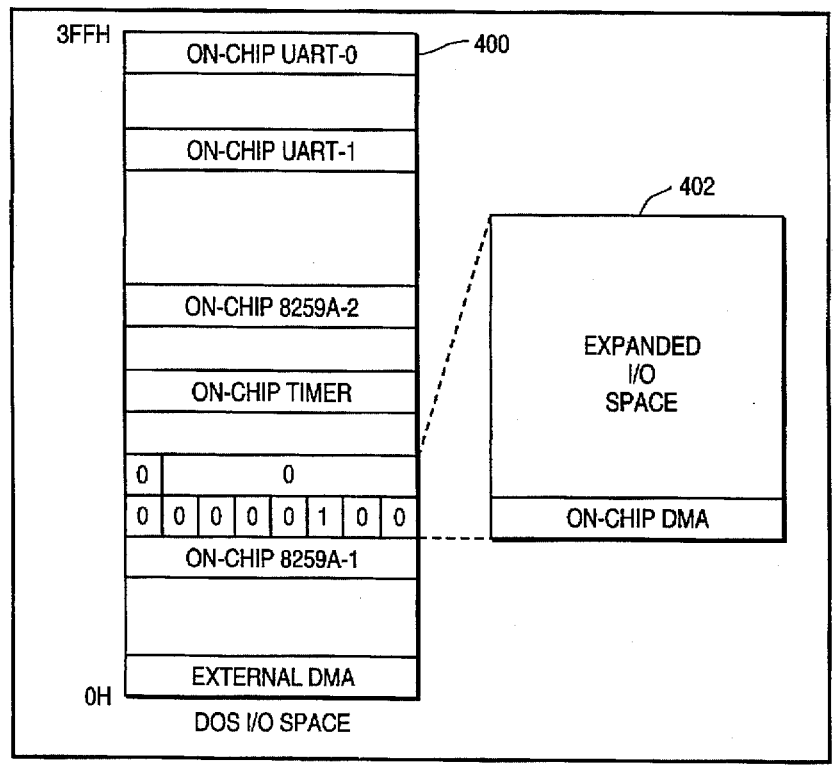
FIG_5

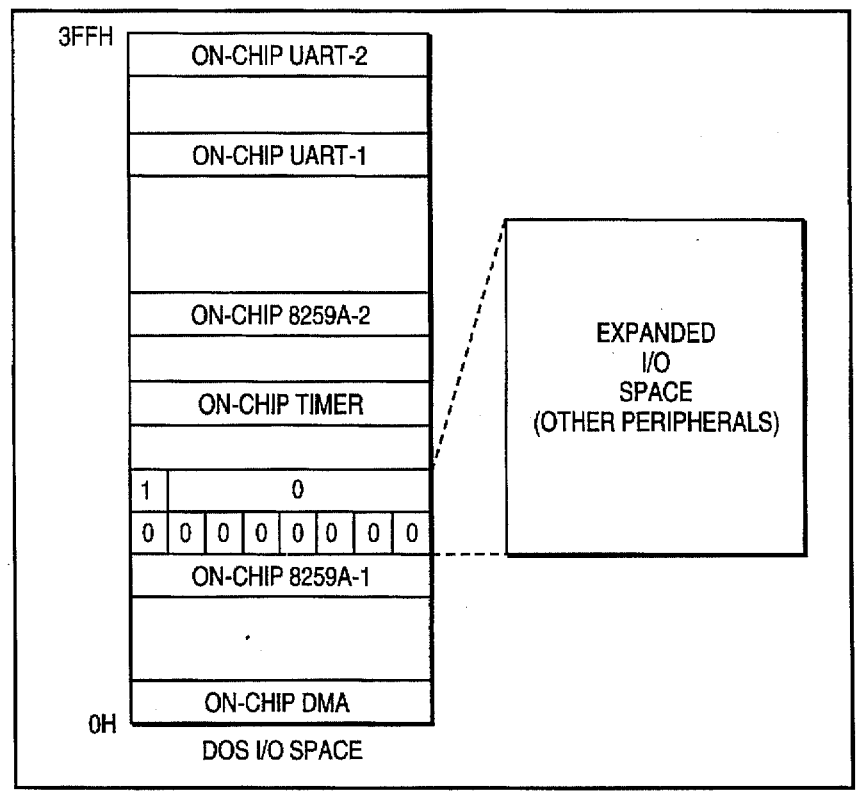
FIG_6
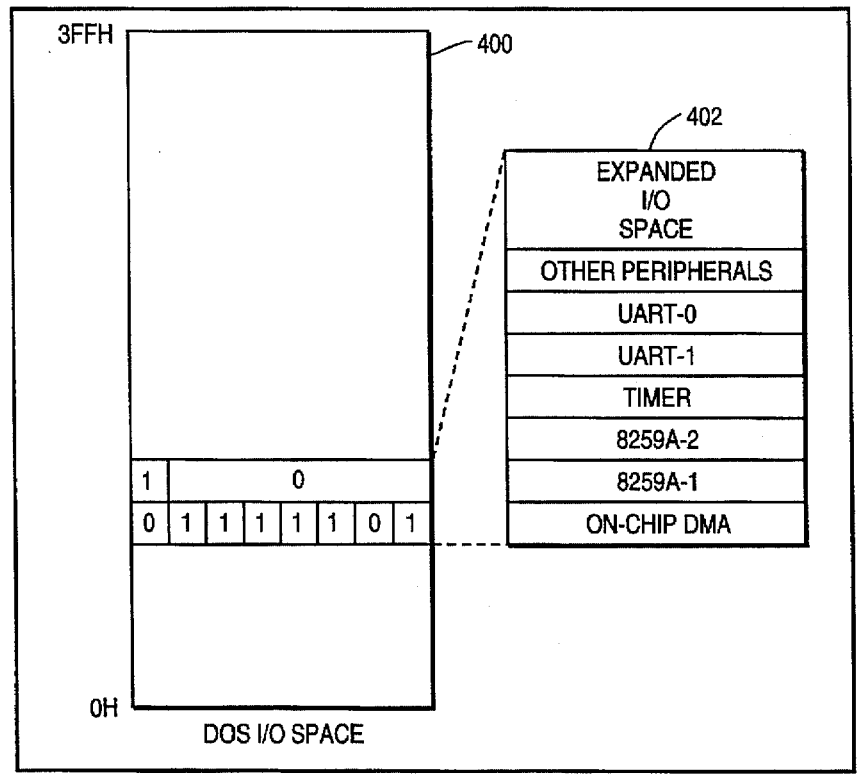
FIG_7

5,699,542

1
ADDRESS SPACE MANIPULATION IN A PROCESSOR

BACKGROUND OF THE INVENTION

1. Field of the Invention

The present invention relates to the field of addressing in a microprocessor, and more particularly to manipulating the address space.

2. Description of the Related Art

Microprocessors incorporating a general purpose processor core, such as the Intel386™ microprocessor, have gained wide-spread acceptance in the world of embedded applications. Applications can achieve a quick time-to-market by using a personal computer-based development environment. The product development cycle can be drastically reduced by embedding popular operating systems like DOS and Microsoft Windows in the operating platform, thus obviating the need for software developers to develop proprietary operating systems. Using the DOS system significantly reduces the required amount of application-specific development and provides a consistent and sophisticated user interface for embedded applications. Many home entertainment and office automation products provide a standard, PC/DOS-like user interface for ease of use. Applications like remote bar-code scanners, data loggers and digital cameras require such PC/DOS compatibility.

Referring to FIG. 1A, a processor like the Intel386 EX microprocessor 100 is designed as a DOS-compatible platform optimized for embedded applications. The Intel386 EX integrates PC/DOS compatible peripherals and non-DOS embedded control-specific peripherals on-chip along with a processor core 101. The DOS-compatible units are DOS-compatible in that they are the same modules as those used in a standard PC-AT architecture and they are situated at the same I/O addresses (the lower 1 KB I/O address range) as those accessed by DOS.

Standard DOS-compatible features on the Intel386 EX microprocessor include a number of units. A timer/counter module 102 can be programmed to operate in various modes, such as an event counter, an elapsed time indicator, or a programmable one-shot. An on-chip direct memory access (DMA) controller 104 includes enhancements beyond the 8237A DMA controller used in the PC architecture. The on-chip DMA controller 104 is capable of transferring data between any combination of memory and I/O, with any combination (8 or 16 bits) of data path widths. However, the on-chip DMA controller 104 does not offer as many DMA channels as the external 8237A DMA controller. Other DOS-compatible on-chip features include interrupt controllers 106 and serial I/O units 108 and 110.

The Intel386 EX microprocessor 100 also incorporates a number of non-DOS embedded applications on-chip as a substitute for common application-specific logic circuits that would normally be external to the processor. A chip select unit 112 decodes bus cycle address and status information and activates chip-select signals. The chip select unit 112 generates an internal ready signal to indicate the completion of a bus cycle. In doing so, the chip select unit eliminates the need for external decoding and ready generation logic. The Intel386 EX microprocessor also integrates on-chip a DRAM refresh control unit 114, a watch dog timer 116 and a clock generation and power management unit 118, among other features. The processor core, the DOS units and the non-DOS units communicate with each other over an intermodule bus 120.

The non-DOS on-chip peripherals are addressed by the full 16 bit address and are mapped to addresses within the upper 4 kilobytes of the 64 kilobyte I/O space. The DOS-compatible features are addressed by the lower 10 bits of the address, and are mapped to addresses within the lower 1 kilobyte of the 64 kilobyte I/O space. Thus, any 16 bit address having its lower ten bits mapped to a DOS peripheral will access a DOS peripheral. Because the upper six address bits are irrelevant to the DOS units, the DOS peripheral addresses are repeated 64 ($2^6$) times (on 1K boundaries), covering the entire 64K address space. Accordingly, the upper 4K of the I/O space is mapped to both the non-DOS peripherals and a "reflection" of the DOS peripherals from the lower 1K address space. The mapping of the upper I/O address space to DOS and non-DOS peripherals is illustrated in FIG. 1B.

The mapping of both DOS and non-DOS compatible features to the same I/O space raises a variety of concerns. In some instances, the application's user may want to use an external DOS stand-alone peripheral instead of one of the on-chip DOS-compatible peripherals. For example, because the on-chip DMA controller 104 does not provide as many channels as an external 8237A DMA controller, a designer may wish to use the 8237A instead of the on-chip DMA 104. If the same 10-bit address is to be used for both DMA controllers, an address conflict between the on-chip DMA 104 and the external DMA arises. In other cases, the user may want to prevent registers in the DOS or non-DOS peripherals from being accessed or overwritten. Other memory configurations are also desirable. It can thus be appreciated that a need exists for a means to manipulate the I/O address space in a processor to provide the user with a variety of addressing modes.

SUMMARY OF THE INVENTION

The present invention provides a method and apparatus for configuring the address space of a computer. According to the present invention, a computer system has a full address space and includes at least one base unit, at least one expansion unit and a microprocessor core. The microprocessor core is used to issue access addresses. The full address space includes a base address space and an expanded address space. The base address space is addressed by an M bit address and the expanded address space is addressed by an N bit address ($N \geq M$). Each base unit is mapped to an address within the base address space, and the base unit address is mirrored in the expanded address space. Each expansion unit is mapped to an address within the expanded address space.

An address configuration circuit in the computer system includes an address space remapping circuit for selectively remapping or not remapping base units out of the base address space. The address configuration circuit also includes an expanded space enabling circuit for selectively enabling or disabling the expanded address space. Expansion units are accessible in the expanded address space depending upon whether the expanded address space has been enabled.

Preferably, the base units are DOS-compatible peripherals, and the expansion units are non-DOS compatible peripherals. For an embodiment, the base units refer to those peripherals within the microprocessor that are required to make the microprocessor compatible with a DOS platform while the expanded units refer to those peripherals within the microprocessor that are not required to operate the microprocessor in a DOS environment. Typically, the expansion units refer to embedded control-specific peripherals. Preferably, the remapping circuit remaps a corresponding base unit out of the base address space if a remap indicator, such as a remap bit in an address configuration register, indicates that the corresponding base unit is to be remapped. Preferably, the expanded space enabling circuit includes an upper address decode circuit for determining whether an upper (N-M) address bits of an access address map to a first address range within the expanded address space, where a first unit is mapped to the first address range. The first unit is either a base unit or an expansion unit. The expanded space enabling circuit enables access to the first unit if the expanded space is enabled and the upper (N-M) address bits are mapped to the first address range.

The address configuration circuit also preferably includes a zero detect circuit for determining whether all of the upper (N-M) address bits are zero bits. The address configuration circuit enables access to a first base unit associated with the zero detect circuit if the expanded space is enabled, the first base unit is not remapped and all of the upper (N-M) address bits are zero bits.

BRIEF DESCRIPTION OF THE DRAWINGS

The objects, features and advantages of the present invention will be apparent to one skilled in the art in light of the following detailed description in which:

FIG. 1A illustrates a processor in which the present invention may be incorporated.

FIG. 1B is a table illustrating a mapping of the expanded I/O address space to DOS and non-DOS peripherals according to an embodiment of the present invention.

FIG. 2B diagrams a bit allocation of the address configuration register according to an embodiment of the present invention.

FIG. 3 is a logic table illustrating the resulting states of the CSD and CSND bits according to the present invention.

FIG. 4 illustrates the I/O address space according to the DOS-compatible mode of the present invention.

FIG. 5 illustrates the I/O space according to the non-intrusive DOS-compatible mode of the present invention.

FIG. 6 illustrates the I/O address space according to the enhanced DOS mode of the present invention.

FIG. 7 illustrates the I/O address space according to the non-DOS mode of the present invention.

DETAILED DESCRIPTION OF THE INVENTION

Figure 2A:
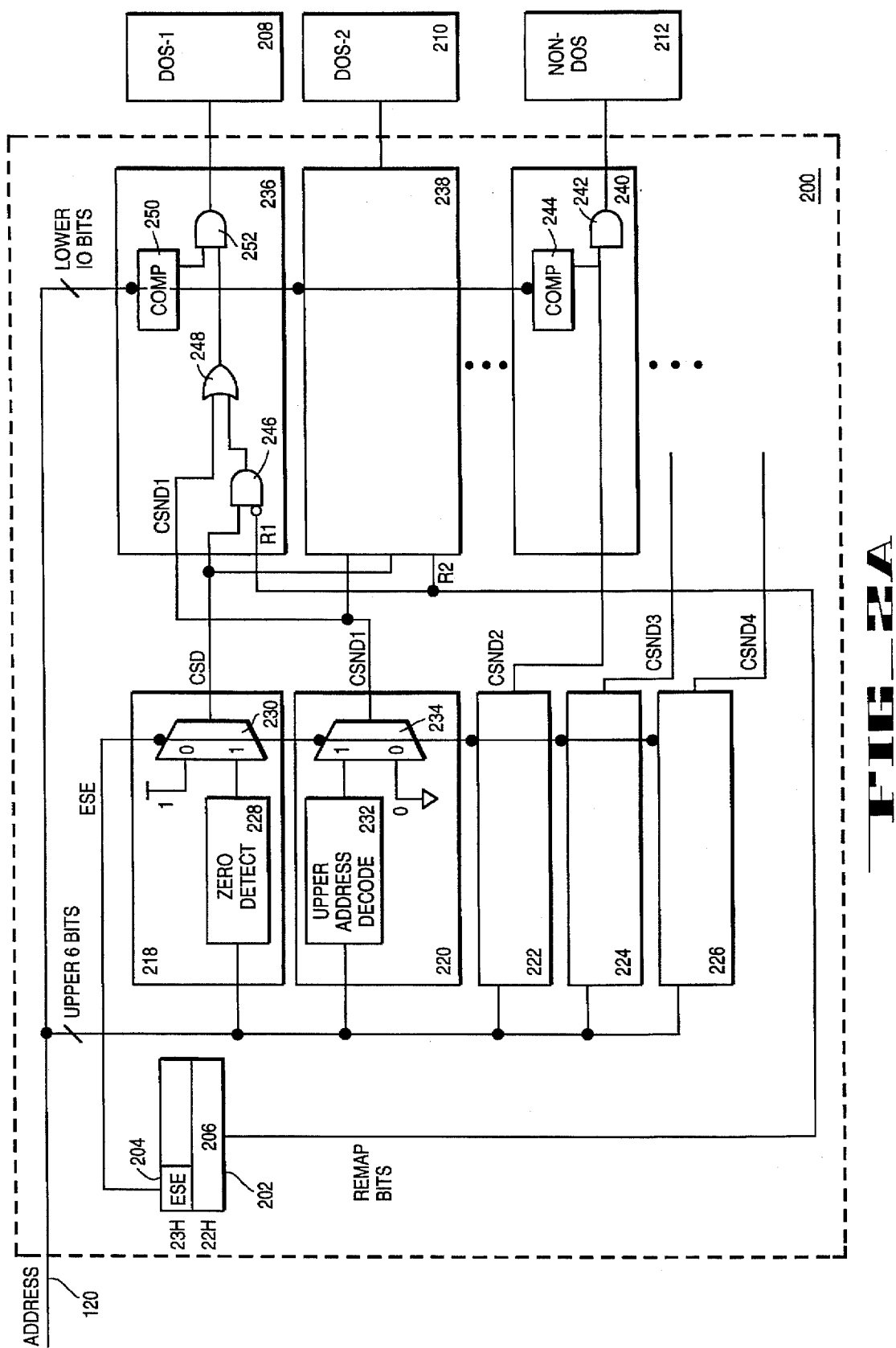
FIG. 2A illustrates the address configuration circuit of the present invention.

The present invention provides a method and apparatus for address space manipulation in a processor. For purposes of explanation, specific details are set forth to provide a thorough understanding of the present invention. However, it will be understood by one skilled in the art, from reading this disclosure, that the invention may be practiced without these details. Moreover, well-known elements, devices, process steps and the like are not set forth in order to avoid obscuring the invention.

FIG. 2A illustrates an address configuration circuit 200 according to the present invention. The address configuration circuit 200 preferably operates in the context of the Intel386 EX microprocessor to manipulate I/O address regions corresponding to DOS and non-DOS compatible peripherals. Typically, the DOS compatible peripherals are those peripherals integrated on-chip with the microprocessor core that are required to operate the processor in a DOS environment. Furthermore, the non-DOS compatible peripherals refer to those peripherals that are also integrated on-chip with the microprocessor core but are not required to operate the processor in a DOS environment. Typically, the non-DOS compatible peripherals are used to perform embedded control type operations. However, those skilled in the art will understand that the present invention applies to any microprocessor and to the manipulation of any address space—not just I/O address space but memory address space as well, and not just to regions assigned to DOS and non-DOS compatible units but generally to any address regions. For an embodiment, DOS compatible peripherals are referred to as the base units and the non-DOS compatible peripherals are referred to as the expanded units.

The address configuration circuit 200 preferably uses I/O address locations 22H and 23H (within the lower 1K DOS I/O area) as an I/O-mapped address configuration register 202. An expanded space enable (ESE) bit 204 preferably resides at bit 15 of the address configuration register 202. Remap bits 206, each corresponding to an on-chip DOS peripheral, preferably reside in the lower 8 bits of the configuration register 202. Each bit allows the corresponding DOS unit to be remapped out of the regular DOS I/O space so that it can only be found within the expanded I/O space to which it is mirrored. A more detailed illustration of the address configuration register 202 is shown in FIG. 2B.

For purposes of illustration, the address configuration circuit 200 is coupled to a first DOS peripheral 208, a second DOS peripheral 210 and a non-DOS peripheral 212. Those skilled in the art will understand from reading this disclosure that the address configuration circuit 200 can easily be extended to access any number of DOS and non-DOS compatible peripherals.

The address configuration circuit 200 preferably includes a DOS chip select circuit 218, a first non-DOS chip select circuit 220, a second non-DOS chip select circuit 222, a third non-DOS chip select circuit 224 and a fourth non-DOS chip select circuit 226. The DOS chip select circuit 218 includes a zero detect circuit 228 and a DOS chip select multiplexer 230.

Each non-DOS chip select circuit includes an upper address decode circuit 232 and a non-DOS chip select multiplexer 234. The second, third and fourth non-DOS chip select circuits 222, 224 and 226, respectively, each include the upper address decode circuit 232 and the non-DOS chip select multiplexer 234 in the same configuration as shown for the non-DOS chip select circuit 220.

The upper six bits of the I/O address, which are provided by the CPU core 101 over the intermodule bus 120, are input into the zero detect circuit 228 and each upper address decode circuit 232. The zero detect circuit 228 outputs a 1 if all of the upper address bits are zero. Associated with the DOS chip select circuit 218 is a DOS chip select signal CSD. Associated with the first, second, third and fourth non-DOS select circuits 220, 222, 224 and 226 are non-DOS chip select signals CSND1, CSND2, CSND3 and CSND4, respectively.

Each upper address decode circuit 232 maintains a mapping of an address range to which DOS or non-DOS peripherals are mapped. Each upper address decode circuit 232 receives the upper six I/O address bits from the CPU core 101 over the intermodule bus 120. If the upper six address bits fall within the I/O address range maintained by a particular upper address decode circuit 232, then that upper address decode circuit outputs a one. If on the other hand, the upper six address bits do not fall within the range maintained by the upper decode circuit 232, then the decode circuit outputs a zero. When the expanded I/O space is enabled (ESE=1), the non-DOS chip select MUX 234 selects as its input the output of the upper address decode circuit 232. As a result, each CSND signal is associated with peripherals that fall within the address range maintained in the upper address decode circuit 232 corresponding to the CSND signal. According to the preferred embodiment, each CSND signal is associated with the address space as follows:

TABLE 1

| Signal | Address Range |
|--------|---------------|
| CSND1  | F000H-F3FFH   |
| CSND2  | F400H-F7FFH   |
| CSND3  | F800H-FBFFH   |
| CSND4  | FC00H-FFFFH   |

Referring back to FIG. 1B, the DOS-compatible units are mapped to regions within the expanded I/O space F000H-F3FFH. These units include the DMA controller 104, the master and slave interrupt controllers 106, the programmable interval timer 102, among others. Referring to Table 1, the DOS address space F000H-F3FFH is mapped to the signal CSND1. In other words, if the upper six address bits of the address presented to the upper address decode circuit 232 in the first non-DOS chip select circuit 220 denote an address that fall within the range F000H-F3FFH, then the signal CSND1 will be asserted. According to FIG. 1B, all addresses above and including F400H are mapped to non-DOS units, such as the chip select unit 112. One of the signals CSND2, CSND3 or CSND4 is asserted depending upon whether the upper six address bits match a non-DOS peripheral address within the corresponding address range shown in Table 1. One skilled in the art will recognize that the present invention is not limited to the mappings of FIG. 1B and Table 1, but may easily be extended to other address mappings as well.

Associated with the first DOS unit 208 is a DOS-compatible unit-specific configuration circuit 236. Associated with the second DOS unit 210 is a second DOS-compatible unit-specific configuration circuit 238. Associated with the non-DOS unit 212 is a non-DOS compatible unit-specific configuration circuit 240.

The non-DOS unit-specific circuit 240 includes an AND gate 242 and an address comparator 244. The address comparator 244 compares the lower 10 bits of the I/O address received over the intermodule bus 120 to the address of the non-DOS unit 212 to which the circuit 240 is coupled. If the lower 10 bits of the address match the address of the associated non-DOS unit, the comparator 244 outputs a one to the AND gate 242. The AND gate also receives the CSND2 signal. The output of the AND gate 242 (if active) selects the non-DOS unit to which it is coupled.

As an example, assume that the non-DOS unit 212 is the chip select unit 112. The chip select unit 112 is mapped to the address range F400H-F47FH (FIG. 1B), which is in turn mapped to the CSND2 signal (Table 1). Accordingly, the AND gate 242 also receives as an input the CSND2 signal from the second non-DOS chip select circuit 222. Other non-DOS units (not shown) mapped to the same address range will also each be associated with a unit-specific circuit, such as circuit 240, that receives the CSND2 signal. The address comparator in each such circuit would compare the lower 10 bits of the address to the address of the corresponding non-DOS unit. Other non-DOS units in other address ranges would be associated with unit-specific configuration circuits that receive the CSND3 or CSND4 signals depending upon the address range to which the non-DOS unit is mapped.

The DOS-compatible unit-specific circuit 236 includes an AND gate 246 having the CSD signal and an inverted Remap bit R1 as inputs. The Remap bit received by each DOS unit's unit-specific configuration circuit is specific to the DOS unit. For example, referring to the address configuration register 202 of FIG. 2B, the unit-specific configuration circuit associated with the DMA controller 104 would receive bit 2 of the configuration register 202.

An OR gate 248 receives as inputs the output of the AND gate 246 and the CSND1 signal from the first non-DOS chip select circuit 220. Recall that CSND1 (unlike CSND2-4) is mapped to the expanded I/O address range corresponding to the DOS units. In circuit 236, an address comparator 250 maintains the address of the first DOS unit 208 and compares it to the lower 10 bits of the I/O address received over the intermodule bus 120. If there is a match, the comparator 250 outputs a 1. An AND gate 252 receives the output of the comparator and the output of the OR gate 248. The output of the AND gate 252 (if active) selects the DOS unit to which it is coupled. The second unit-specific configuration circuit 238 is identical to the circuit 236, except the circuit 238 receives the Remap bit corresponding to the second DOS unit 210, and the comparator within circuit 238 compares the lower 10 address bits to the address corresponding to the second DOS unit 210. Those skilled in the art will recognize that the address configuration circuit 200 may easily be extended to access any number of DOS and non-DOS units.

The operation of the address configuration circuit 200 will now be described. FIG. 3 is a logic table illustrating the conditions necessary to assert the CSD and CSND signals. For the sake of convenience, the CSND signal may represent any of the signals CSND1-4. Referring to line (1) of FIG. 3, if the expanded I/O space is disabled (the ESE bit 204 is set to zero), then the CSD signal is set to 1 through the MUX 230, and the CSND signal is set to zero through the MUX 234. As shown in line (4), the CSD signal is also asserted high if the expanded I/O space is enabled (ESE=1) and the zero detect signal is asserted. The latter configuration indicates that although the expanded space is enabled, the CPU core 101 is asserting a 16-bit I/O address having a lower 10 bits corresponding to the lower 1K of the I/O address space.

Referring to line 3, if the expanded space is enabled, then the access could be either to a non-DOS unit or a DOS unit depending upon the state of the upper six address bits. If one of the upper six address bits is set to 1, then zero detect=0 and CSD=0. If the upper address falls within an address range mapped by the upper address decode circuit, then upper address decode=1, and CSND will be set to 1.

For example, the DOS-compatible master interrupt controller is found at address 0020H. Because the interrupt controller is a DOS unit, its address space is mirrored 64 times on 1K boundaries. Thus, referring to FIG. 1B, in the upper 4K address space, the interrupt controller is mapped to the address F020H. If the expanded space is enabled (ESE=1) and the address presented to the address configuration circuit 200 is F020H, then CSD=0 because the zero detect circuit 228 for the upper six address bits does not detect all zeroes. However, just because CSD=0, this does not mean that a DOS unit cannot be accessed. Because the interrupt controller address 0020H is mirrored to F020H, the upper six bit binary value 1111 00 is mapped in the upper address decode circuit 232 of circuit 220 to the master interrupt controller. Thus, the address F020H results in a match in the upper address decode circuit 232, thereby setting the CSND1 bit to 1.

Referring to line (2), if the expanded space is enabled (ESE=1), the upper six address bits include a non-zero bit (zero detect=0) and the upper six bits do not match any of the non-DOS units (upper address decode=0), then neither a DOS unit nor a non-DOS unit will be selected (CSD=0, CSND=0). In this case, the access will be treated as an off-chip peripheral access.

For example, assume that the address B020H is presented to the address configuration circuit 200 and the expanded I/O space is enabled (ESE=1). The upper six bits of the address are non-zero, thereby zero detect=0. Further, referring to Table 1, that address does not fall within any of the ranges mapped to any of the CSND signals. As a result, both CSD=0 and CSND=0. In this case, the address B020H will not access either the DOS or non-DOS on-chip peripherals. Rather, the access must take place off-chip.

Using the above discussion as background, manipulation of the I/O address space will now be described. The address configuration circuit 200 of the present invention operates in four basic modes: DOS-Compatible Mode; Nonintrusive DOS Mode; Enhanced DOS Mode; and Non-DOS Mode.

FIGS. 4 through 7 illustrate the configuration of the DOS I/O space 400 and the expanded I/O space 402 in the four modes. The figures illustrate the address mapping used in the Intel386 EX microprocessor in which the configuration register 202 occupies addresses 22H and 23H within the lower 1K DOS space 400. The expanded I/O space 402 in FIG. 4 and the expanded I/O space 402 in FIG. 5 depict I/O space that is not accessible according to the setting of the ESE and Remap bits. In this example, the on-chip DMA 104, the two on-chip 8259A interrupts controllers 106, the on-chip timer 102, and the two asynchronous serial I/O units (UARTs) 110, are shown as being mapped within the DOS I/O space 400.

Referring to FIG. 4, in full DOS-compatible mode, ESE=0 and all peripherals' Remap bits=0. In this mode all DOS peripherals are mapped into the DOS I/O space 400. In other words, the DOS peripherals are not remapped out of the lower 1K I/O address space 400. Only the lower ten address bits are decoded for on-chip peripherals. Thus, accesses to DOS peripherals are valid, whereas non-DOS peripherals are inaccessible as indicated by the expanded I/O space region 402. As shown in FIG. 3, when ESE=0, CSD=1 and all CSNDs=0. With all Remap bits=0 and CSD=1, the input to one input of the AND gate 252 in each DOS-unit specific configuration circuit (236 and 238) is 1. If the lower ten bits of the address input to the address comparator 250 match the 10 bit DOS unit address, then the unit will be accessed by the address. For example, all of the addresses 0020H, B020H, and F020H would access the master interrupt controller DOS unit (mapped to F020H) because the lower 10 bits of those addresses match the 10 bit address of the DOS interrupt controller.

In summary, in DOS-compatible mode, although non-DOS peripherals cannot be accessed in the expanded I/O space 402 (CSND=0), DOS peripherals can be accessed with any address for which the lower 10 bits match the DOS address of the peripheral.

Referring to FIG. 5, the non-intrusive DOS mode is characterized by ESE=0 and an individual peripheral's Remap bit=1. A peripheral whose corresponding Remap bit is set to 1 will be mapped out of the DOS I/O space 400 to be found only in the expanded I/O space 402. Only the lower 10 address bits are decoded internally. Mapped-out DOS peripherals and all non-DOS peripherals are inaccessible because ESE=0.

FIG. 5 illustrates an example in which the Remap bit in register 22H is set to 1 for the DOS on-chip DMA controller 104. The on-chip DMA area in expanded I/O space inaccessible in the expanded I/O space 402 because ESE=0. By remapping the on-chip DMA 104 out of the DOS I/O space 400, a user can substitute an external DOS-compatible peripheral for the on-chip DMA controller 104. For example, as shown in FIG. 5, a designer may connect an external 8237A DMA so that it can be accessed in the DOS I/O space formerly occupied by the on-chip DMA controller (starting at 0H). Comparing FIG. 5 to FIG. 4, the external DMA 104 now occupies the address space formerly occupied by the on-chip DMA starting at 0H. With respect to the unit-specific configuration circuit, in this mode the Remap bit=1 and ESE=0 (CSD=1, CSND=0) forces the output of OR gate 248 to 0, thus making an access to an on-chip DOS unit impossible if its Remap bit=1. Consequently, the access must go off-chip to a device such as an external DMA controller mapped to the same address as the remapped DOS unit.

The enhanced DOS mode is characterized by ESE=1 and all peripherals' Remap bits=0. In this mode, all sixteen address lines are decoded. All on-chip DOS peripherals are accessible in both the DOS I/O space 400 and the expanded I/O space 402, as shown in FIG. 6. The non-DOS peripherals are, of course, also accessible in the expanded I/O space 402. This mode permits full accessibility to both DOS and non-DOS units.

For example, referring to line 4 of FIG. 3, the address 0020H will cause a zero detect, which in turn will force CSD=1. Because all Remap bits=0 and CSD=1, the output of AND gate 246 in the unit-specific configuration circuits 236 and 238 will be one. Assume that the second DOS unit 210 is the master interrupt controller, having an address 0020H. The lower 10 bits of the address 0020H match the address of the interrupt controller 210 in comparator 250 of unit-specific circuit 238. Thus, the second DOS unit 210 will be accessed through AND gate 252. Further, if the address F020H were used to address the interrupt controller, this address would lead to an upper address decode match (see Table 1) in DOS unit-specific circuit 238, thereby forcing CSND1=1 (FIG. 3, line 3), and resulting in an access of the master interrupt controller because the lower 10 bits would match in the address comparator 250.

As an example of a non-DOS access, referring to line 3 of FIG. 3, assume an access is to be made to a non-DOS unit such as the chip select unit 112 at F400H. The non-DOS units are found only in the expanded I/O space. Thus, the expanded space must be enabled (ESE=1). The upper address decode circuit 232, corresponding to CSND2 will be active, according to Table 1. Accordingly, CSD=0 and CSND2=1. The address comparator 244 corresponding to the chip select unit 112 will compare the lower 10 bits of the address F400H to the lower 10 bits of the address of the chip select unit 112, resulting in a match. This match combined with the CSND2=1 bit in the AND gate 242 results in the chip select unit 112 being selected.

The enhanced DOS mode is useful if the user frequently requires the additional on-chip peripherals available on the Intel386 EX microprocessor, but at the same wants to take advantage of some level of DOS compatibility for ease of development.

The non-DOS mode shown in FIG. 7 is characterized by ESE=1 and one or more individual peripheral's Remap bit=1. A complete non-DOS mode is accomplished when all Remap bits are set to 1. In non-DOS mode all 16 address lines are decoded. On-chip DOS peripherals for which the Remap bit is set to 1 can be accessed only in the expanded I/O space 402. The designer can place other peripherals in the corresponding region of DOS I/O space 400 with no conflict. The non-DOS mode is thus similar to the non-intrusive DOS mode in that regions of the DOS I/O space are made available for accessing external peripherals. In contrast, however, the non-DOS mode permits access to the remapped DOS peripherals in the expanded I/O space 402.

With reference to the unit-specific configuration circuit 238, if an attempt is made to access the interrupt controller using the address 0020H, then CSD=1 and CSND=0 (FIG. 3, line 4). Because the Remap bit=1, the output of AND gate 246 is 0. Thus, the interrupt controller cannot be accessed with the address 0020H because it has been remapped out of the DOS I/O space 400. If, however, the address F020H were used to access the interrupt controller, then the upper address decode circuit corresponding to CSND1 will be active because the 16 bit address F020H falls within the address range of the CSND1 interrupt controller in the upper address decode circuit (see Table 1). This forces CSD=0 and CSND1=1 (FIG. 3, line 3). Because the lower 10 bits of F020H match the DOS address of the interrupt controller, the output of the AND gate 252 will be high, resulting in an access of the DOS-compatible interrupt controller with the expanded I/O address F020H.

The flexibility of the address configuration circuit 200 provides the system designer with a number of advantages. As described above, in DOS-compatible mode, the system can be used to act solely as a DOS machine. In non-intrusive DOS mode, the designer may substitute external peripherals for on-chip DOS peripherals without creating an address conflict. In enhanced DOS mode, the entire address space is accessible using the full 16 bit address. In non-DOS mode, both on-chip DOS and non-DOS peripherals are accessible in the expanded I/O space, while at the same time the lower 1K address space may be freed for assignment to external peripherals. Further, with a DOS peripheral mapped into the DOS I/O space, the designer can program the peripheral and then remap the peripheral into inaccessible expanded I/O space. This action locks out the programmable DOS peripheral and prevents its programmable registers from being overwritten. Similarly, with expanded space enabled, the designer can program non-DOS units within the expanded space, and then disable the expanded space to lock out those units.

It will be appreciated that various modifications and alterations might be made by those skilled in the art without departing from the spirit and scope of the present invention. In particular, as discussed above, those skilled in the art will understand that the present invention applies to any microprocessor and to the manipulation of any address space—not just I/O address space but memory address space as well, and not just to regions assigned to DOS and non-DOS compatible units but generally to any address regions. The invention should, therefore, be measured in terms of the claims which follow.

What is claimed is:

1. In a computer system having a full address space and including at least one DOS-compatible peripheral, at least one non-DOS compatible peripheral and a microprocessor core, the microprocessor core for issuing access addresses, the full address space including a base address space and an expanded address space, wherein the base address space is addressed by an M bit address and the expanded address space is addressed by an N bit address (N≧M), each DOS-compatible peripheral is mapped to an address within the base address space, the DOS-compatible peripheral address being mirrored in the expanded address space, and each non-DOS compatible peripheral is mapped to an address within the expanded address space, a method for configuring the full address space comprising the steps of:

not remapping the at least one DOS-compatible peripheral of the base address space; and disabling the expanded address space, such that the at least one non-DOS compatible peripheral is not accessible in the expanded address space once the expanded address space has been disabled, and wherein the each DOS-compatible peripheral is accessible only in the base address space.

2. The method of claim 1, wherein M=10 and N=16.

3. The method of claim 1, further comprising the step of accessing a first DOS-compatible peripheral if a lower M address bits of an access address match the address of the first DOS-compatible peripheral.

4. The method of claim 1, wherein a secondary DOS-compatible peripheral is mapped to a first address within the base address space.

5. The method of claim 4, wherein the secondary DOS-compatible peripheral is an external DMA controller.

6. The method of claim 1, wherein a first accessible unit is an accessible DOS-compatible peripheral or an accessible non-DOS-compatible peripheral, the method further comprising the step of accessing the first accessible unit if (an upper N-M bits of an access address map to an address range to which the first accessible unit is mapped or the upper N-M bits are all zero bits) and (a lower M bits of the access address match the lower M bits of the address of the first accessible unit).

7. The method of claim 6, wherein a secondary DOS-compatible peripheral is mapped to a first address within the base address space.

8. The method of claim 7, wherein the secondary DOS-compatible peripheral is external to the processor chip.

9. The method of claim 8, wherein the secondary DOS-compatible peripheral is an external DMA controller.

10. In a computer system having a full address space and including at least one DOS-compatible peripheral, at least one non-DOS-compatible peripheral, and a microprocessor core that issues access addresses to a full address space that includes a base address space and an expanded address space, wherein the base address space is addressed by an M-bit address and the expanded address space is addressed by an N-bit address (N≧M), each DOS-compatible peripheral being mapped to an address within the base address space, the DOS-compatible peripheral address being mirrored in the expanded address space, and each non-DOS-compatible peripheral being mapped to an address within the expanded address space, an address configuration circuit comprising:

an address space remapping circuit that selectively remaps the at least one DOS-compatible peripheral out of the base address space; and an expanded space disabling circuit that selectively disables the expanded address space, wherein the at least one non-DOS-compatible peripheral is accessible in the expanded address space if the expanded address space has not been disabled, and the at least one non-DOS-compatible peripheral is not accessible in the expanded address space if the expanded address space has been disabled;

a storage circuit that stores at least one remap indicator; and wherein the remapping circuit including first circuitry coupled to a corresponding DOS-compatible peripheral that remaps the corresponding DOS-compatible peripheral out of the base address space if the remap indicator indicates that the corresponding DOS-compatible peripheral is to be remapped.

11. The address configuration circuit of claim 10, wherein M=10 and N=16.

12. The address configuration circuit of claim 10, wherein the expanded space enabling circuit comprises an upper address decode circuit for receiving an upper (N-M) address bits of an access address and for determining whether the upper (N-M) address bits map to a first address range within the expanded address space, wherein a first unit is mapped to the first address range, the first unit being either a DOS-compatible peripheral or an non-DOS-compatible peripheral, the expanded space enabling circuit enabling access to the first unit if the expanded space is enabled and the upper (N-M) address bits map to the first address range.

13. The address configuration circuit of claim 12, wherein the enabled first unit is accessed if the lower M bits of the access address match the address of the first unit.

14. The address configuration circuit of claim 10, further comprising a zero detect circuit for receiving an upper (N-M) address bits of an access address and for determining whether all of the upper (N-M) address bits are zero bits, the address configuration circuit enabling access to a first DOS-compatible peripheral associated with the zero detect circuit if the expanded space is enabled, the first DOS-compatible peripheral is not remapped, and all of the upper (N-M) address bits are zero bits.

15. The address configuration circuit of claim 14, wherein the first DOS-compatible peripheral is accessed if the lower M-bits of the access address match the address of the first DOS-compatible peripheral.

16. The address configuration circuit of claim 10, wherein the expanded space is disabled and at least one DOS-compatible peripheral is remapped, so that only DOS-compatible peripherals that have not been remapped are accessible, the DOS-compatible peripherals that have not been remapped being accessible only in the base address space, the remapped DOS-compatible peripherals and the non-DOS-compatible peripherals being inaccessible.

17. The address configuration circuit of claim 10, wherein a first DOS-compatible peripheral that has not been remapped is accessed if a lower M address bits of an access address match the address of the first DOS-compatible peripheral.

18. The address configuration circuit of claim 10, wherein a secondary DOS-compatible peripheral is mapped to a first address within the base address space, a first remapped DOS-compatible peripheral formerly being mapped to the first address.

19. The address configuration circuit of claim 18, wherein the first remapped DOS-compatible peripheral is integrated on a processor chip and the secondary DOS-compatible peripheral is external to the processor chip.

20. The address configuration circuit of claim 19, wherein the first remapped DOS-compatible peripheral is an on-chip DMA controller and the secondary DOS-compatible peripheral is an external DMA controller.

21. A computer system having a full address space comprising:
at least one DOS-compatible peripheral;
at least one non-DOS-compatible peripheral;
a microprocessor core that issues access addresses, the full address space including a base address space and an expanded address space, wherein the base address space is addressed by a M-bit address and the expanded address space is addressed by a N-bit address (N≥M), each DOS-compatible peripheral is mapped to a base address within the base address space, the base address being mirrored in the expanded address space, and each non-DOS-compatible peripheral is mapped to an expanded address within the expanded address space; and
an address configuration circuit comprising:
an address space remapping circuit that selectively remaps the at least one DOS-compatible peripheral out of the base address space;
an expanded space disabling circuit that selectively disables the expanded address space, wherein the at least one non-DOS-compatible peripheral is inaccessible in the expanded address space if the expanded address space has been disabled; and
a storage circuit that stores at least one remap indicator, the remapping circuit including first circuitry that remaps a corresponding DOS-compatible peripheral out of the base address space if the remap indicator indicates that the corresponding DOS-compatible peripheral is to be remapped.

22. The computer system of claim 21, wherein M=10 and N=16.

23. The computer system of claim 21, wherein the expanded space disabling circuit comprising an upper address decode circuit which receives an upper (N-M) address bits of an access address and determines whether the upper (N-M) address bits map to a first address range within the expanded address space, wherein a first unit is mapped to the first address range, the first unit being either a DOS-compatible peripheral or a non-DOS-compatible peripheral.

24. The computer system of claim 21, the address configuration circuit further comprising a zero detect circuit which receives an upper (N-M) address bits of an access address and determines whether all of the upper (N-M) address bits are zero bits, wherein the address configuration circuit not disabling access to a first DOS-compatible peripheral associated with the zero detect circuit if the expanded space is not disabled, the first DOS-compatible peripheral is not remapped, and all of the upper (N-M) address bits are zero bits.

25. The computer system of claim 24, wherein the first DOS-compatible peripheral is accessed if the lower M-bits of the access address match the address of the first DOS-compatible peripheral.

26. The computer system of claim 21, wherein the expanded space is disabled and each DOS-compatible peripheral is not remapped, so that the each DOS-compatible peripheral is accessible only in the base address space.

27. The computer system of claim 26, wherein a first DOS-compatible peripheral is accessed if a lower M address bits of an access address match the address of the first DOS-compatible peripheral.

28. The computer system of claim 21, wherein the expanded space is disabled and at least one DOS-compatible peripheral is remapped, so that only DOS-compatible peripherals that have not been remapped are accessible, the DOS-compatible peripherals that have not been remapped being accessible only in the base address space, the remapped DOS-compatible peripherals and the non-DOS-compatible peripherals being inaccessible.

29. The computer system of claim 28, wherein a secondary unit is mapped to a first address within the base address space, a first remapped DOS-compatible peripheral formerly being mapped to the first address.

30. The computer system of claim 29, wherein the first remapped DOS-compatible peripherals is integrated on a processor chip and the secondary unit is a DOS-compatible peripheral external to the processor chip.

31. The computer system of claim 30, wherein the first remapped DOS-compatible peripheral is an on-chip DMA controller and the secondary unit is an external DMA controller.

32. The computer system of 31, wherein a first accessible unit is an accessible DOS-compatible peripheral or an accessible non-DOS-compatible peripheral, and the first accessible unit is accessed if an upper N-M bits of an access address map to an address range to which the first accessible unit is mapped or the upper N-M bits are all zero bits and a lower M bits of the access address match the lower M bits of the address of the first accessible unit.

* * * * *